United States Patent Office 3,594,380
Patented July 20, 1971

3,594,380
ISOQUINOLIN-1(2H)-ONES
Theodore S. Sulkowski, Narberth, Pa., assignor to American Home Products Corporation, New York, N.Y.
No Drawing. Continuation-in-part of application Ser. No. 627,284, Mar. 31, 1967. This application Feb. 18, 1969, Ser. No. 800,275
Int. Cl. C07d 35/14
U.S. Cl. 260—256.4          10 Claims

ABSTRACT OF THE DISCLOSURE

This invention is concerned with imidazolinylisoquinolinones and pyrimidinylisoquinolinones which are pharmacologically active as central nervous system depressants.

---

This application is a continuation-in-part of copending application Ser. No. 627,284 filed Mar. 31, 1967 now abandoned.

This invention relates to new and novel isoquinolinones. In particular, this invention is concerned with imidazolinylisoquinolinones and pyrimidinylisoquinolinones which are pharmacologically efficacious as central nervous system depressants in that they produce a calming effect in the host.

The new and novel isoquinolinones which are within the purview of the present invention are depicted by the following formula:

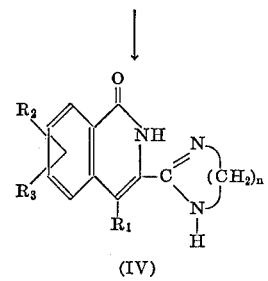

wherein $R_1$ is selected from the group consisting of phenyl, lower alkylphenyl, lower alkoxyphenyl, halophenyl, phen-(lower) alkyl, furyl, thienyl, and naphthyl; $R_2$ and $R_3$ are both selected from the group consisting of hydrogen, halogen, amino, lower alkyl and lower alkoxy; $n$ is an integer from 2 to 3; and the pharmaceutically acceptable acid addition salts thereof. Typical examples thereof are:
4 - (4-chlorophenyl)-3-(2-imidazolin-2-yl)-isoquinolin-1-(2H) - one and 4-(4-chlorophenyl)-3-(3,4,5,6-tetrahydropyrimidin-2-yl)-isoquinolin-1-(2H)-one.

The new and novel isoquinolinones of the present invention are prepared by the process which is hereinafter schematically illustrated:

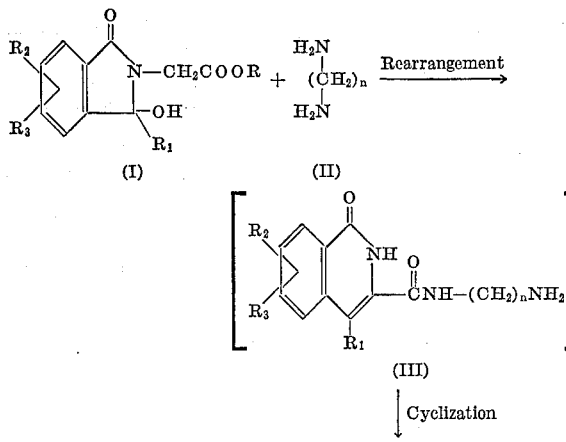

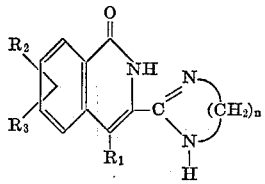

(IV)

wherein $R_1$, $R_2$, $R_3$ and $n$ are defined as above and R is lower alkyl. The above reaction is effected by refluxing an isoindolineacetic acid (I) with a diamine (II) for a period of about ten to about twenty-four hours. This reaction may be conducted without a solvent or in a reaction-inert organic solvent, such as benzene, xylene and toluene.

When the reaction is complete, the resulting isoquinolinone (IV) is separated by standard recovery procedures. For example, when the reaction is conducted without a solvent, the reaction mixture may be evaporated to dryness, the residue slurried with water, filtered and recrystallized from a suitable solvent, e.g. benzene, ethyl acetate, methanol, ethanol and isopropanol. Alternatively, when the reaction is conducted in a reaction-inert organic solvent, the reaction mixture may be extracted with water, evaporated to dryness, the resulting residue dissolved in a water immiscible solvent e.g. ethyl acetate, filtered and the collected precipitate recrystallized from a recrystallizing solvent as defined above.

In the process as schematically exemplified above, the intermediate which is formed, an oxoisoquinolinecarboxamide (III), is not separated and is directly converted to the corresponding isoquinolinone (IV). Naturally, if desired, one skilled in the art of organic chemistry could regulate the reaction conditions to form and isolate the intermediate (III) which may then be converted to the desired isoquinolinone (IV). Further, as exemplified in Example V, when the reaction conditions are such that there is an incomplete conversion of the intermediate (III) to the desired isoquinolinone (IV), the unconverted intermediate may be separated e.g. precipitation from the mother liquor, and converted to its corresponding isoquinolinone by refluxing it in pyridine for about seventeen hours.

The diamine (II) reactants employed in the preparation of the compounds of this invention are commercially available. The isoindolineacetic acid ester (I) reactants are prepared by the interaction of an acid chloride (formed by reacting an o-benzoylbenzoic acid and thionyl chloride) with an alkyl glycinate in pyridine at a temperature range from about 50° C. to about 110° C. for a period of about one-half to about two hours. Thereafter, the reaction mixture is extracted, e.g. ethyl acetate, carbon tetrachloride and ether; evaporated to dryness and recrystallized from a suitable solvent e.g. an alkanol, ethyl acetate and benzene. In this manner, and as specifically exemplified in Example I, the isoindolineacetic acid ester (I) reactants may be prepared for utilization in the preparation of the compounds of this invention.

Since the nitrogen containing isoquinolinones of the present invention are basic, advantage may be taken of the water solubility of salts of these compounds formed with acids in the isolation and/or purification of the above compounds and in the preparation of aqueous solutions of these new compounds for oral or parenteral administration. Of course, only salts formed with pharmaceutically acceptable acids should be employed in therapeutic application. Particularly effective salts are those formed with pharmaceutically acceptable acids having a pH value of 3 or lower. Such acids are well-known in the art, for example, hydrochloric, hydrobromic, hydroiodic sulfuric, nitric, phosphoric, acetic, lactic, citric, tartaric, maleic, gluconic, benzenesulfonic, toluenesulfonic, methylsulfonic, ethylsulfonic acids and the like. These salts may be prepared by procedures commonly employed in the art for example, reacting the compound with an equivalent of the selected acid in aqueous solution and concentration of the solution. Other known procedures may also be employed.

In accord with the present invention, the isoquinolinones (IV) of this invention have been found to possess interesting pharmaceutical properties which render them useful as synthetic medicinals. More particularly, these compounds in standard pharmacological tests, have exhibited utility as central nervous system depressants.

In the pharmacological evaluation of the biological activity of the compounds of this invention, in vivo effects are tested as follows. The compound is administered orally or intraperitoneally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) autonomic activity (i.e. miosis, mydriasis, diarrhea) are noted.

The isoquinolines (IV) in the above procedure induce decreased motor activity at doses of 40 to 127 mg./kg. of host body weight.

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches in which the active ingredient is mixed with sugar and corn syrups; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally larger quantities of the active agent will be required to produce the same effect as a smaller quantity given parenterally. In general, the compounds of invention are most desirably administered at a concentration level that will generally afford effective results without causing any harmful or deleterious side effects and preferably at a level that is in the range of from about 4 mg. to about 16 mg. per kg. of body weight per day, although as aforementioned variations will occur. However, a dosage level that is in the range of from about 8 mg. to about 12 mg. per kg. of body weight per day is most desirably employed in order to achieve effective results.

The following examples are given by way of illustration and are not to be construed as limitations of this invention, many variations of which are possible without departing from the scope and spirit thereof.

EXAMPLE I

The acid chloride prepared by reacting 50 g. of o-(p-chlorobenzoyl)benzoic acid and thionyl chloride is dissolved in 50 ml. of benzene and added over twenty minutes to a solution of 50 g. of ethylglycinate hydrochloride and 150 ml. of pyridine. The mixture is stirred and refluxed for two hours then evaporated to dryness. The residue is extracted with ethyl acetate and water, and thereafter, the ethyl acetate portion is evaporated to a solid residue. On recrystallization from 95% ethanol, there is obtained 3-(4-chlorophenyl)-3-hydroxy-1-oxo-2-isoindolineacetic acid, ethyl ester, M.P. 140–2° C.

*Analysis.*—Calcd. for $C_{18}H_{16}NClO_4$ (percent): C, 62.52; H, 4.66; N, 4.05; Cl, 10.26. Found (percent): C, 62.42; H, 4.59; N, 3.94; Cl, 10.25.

EXAMPLE II

Ten grams of the isoindolineacetic acid ethyl ester as prepared in Example I, 25 ml. of ethylenediamine, and 50 ml. of toluene are refluxed for seventeen hours. The solution is cooled, extracted several times with water, and then evaporated to dryness. The residue is dissolved in ethylacetate and left at room temperature. The precipitated solid is separated, washed with alcohol and recrystallized from ethanol to afford 4-(4-chlorophenyl)-3-(2-imidazolin-2-yl)-isoquinolin-1-(2H)-one, M.P. 255–7° C.

*Analysis.*—Calcd. for $C_{18}H_{14}ClN_3O$ (percent): C, 66.77; H, 4.36; N, 12.98; Cl, 10.95. Found (percent): C, 66.80; H, 4.48; N, 13.37; Cl, 10.9.

In a similar manner, 3-(4-bromophenyl)-3-hydroxy-1-oxo-2-isoindolineacetic acid, ethyl ester is reacted with ethylenediamine to yield 4-(4-bromophenyl)-3-(2-imidazolin-2-yl)-isoquinolin-1-(2-H)-one.

EXAMPLE III

Thirty-four grams of 5-chloro-3-hydroxy-1-oxo-4-phenyl-2-isoindolineacetic acid ethyl ester and 150 ml. of ethylenediamine are refluxed for ten hours. Thereafter, the solution is evaporated to dryness, the residue slurried with water and the solid separated by filtration. On recrystallization from ethanol, there is obtained 6-chloro-3-(2-imidazolin-2-yl)-4-phenyl-isoquinolin-1-(2H)-one.

Similarly, 7 - amino - 3-(2-imidazolin-2-yl)-4-(4-tolyl)-isoquinolin-1-(2H)-one; 3-(2-imidazolin-2-yl)-4-(5,6,7,8-tetrahydro-2-naphthyl)-isoquinolin-1-(2H)-one; and 6,7-dichloro - 3(2 - imidazolin - 2-yl)-4-phenylisoquinolin-1-(2H)-one are prepared.

EXAMPLE IV

Repeating the procedures of Examples II and III, to react an appropriate isoindolineacetic acid ester with ethylenediamine the following imidazolinylisoquinolinones are prepared:

3-(2-imidazolin-2-yl)-4-(2-thienyl)-isoquinolin-1-(2H)-one;
7-fluoro-3-(2-imidazolin-2-yl)-5-methyl-4-phenyl-isoquinolin-1-(2H)-one;
6,7-dibromo-3-(2-imidazolin-2-yl)-4-phenyl-isoquinolin-1-(2H)-one;
6-ethyl-3-(2-imidazolin-2-yl)-4-(4-methoxyphenyl)-isoquinolin-1-(2H)-one;
3-(2-imidazolin-2-yl)-7-methoxy-4-phenyl-isoquinolin-1-(2H)-one;
6,7-diethoxy-3-(2-imidazolin-2-yl)-4-phenyl-isoquinolin-1-(2H)-one; and
3-(2-imidazolin-2-yl)-4-phenethyl-isoquinolin-1-(2H)-one.

EXAMPLE V

Seventeen grams of the isoindolineacetic acid ethyl ester of Example I and 75 ml. of 1,3-diaminopropane are refluxed for eighteen hours. The solution is evaporated to dryness. The residue is slurried with water and the solid separated by filtration. On recrystallization from ethanol, there is obtained 4-(4-chlorophenyl)-3-(3,4,5,6-tetrahydropyrimidin - 2-yl)-isoquinolin-1-(2H)-one, M.P. 258–260° C.

*Analysis.*—Calcd. for $C_{19}H_{16}ClN_3O$ (percent): C, 67.55; H, 4.77; N, 12.48; Cl, 10.50. Found (percent): C, 67.60; H, 4.84; N, 12.40; Cl, 10.5.

On standing, the filtrate from the above reaction affords N-(3-aminopropyl)-4-(4-chlorophenyl)-1,2-dihydro-1-oxoisoquinoline-3-carboxamide, M.P. 188–190° C.

*Analysis.*—Calcd. for $C_{19}H_{18}N_3ClO_2$ (percent): C, 64.13; H, 5.10; N, 11.81; Cl, 9.97. Found (percent): C, 64.06; H, 4.78; N, 12.10; Cl, 9.9.

Refluxing this carboxamide in pyridine for seventeen hours affords 4-(4-chlorophenyl)-3-(3,4,5,6-tetrahydropyrimidin-2-yl)-isoquinolin-1-(2H)-one.

EXAMPLE VI

Twenty grams of 3-benzyl-3-hydroxy-1-oxo-2-isoindoline-acetic acid, 50 ml. of 1,3-diaminopropane and 100 ml. of xylene were refluxed for twenty-four hours. The solution is cooled, extracted several times with water, then evaporated to dryness. The residue is dissolved in ethylacetate and left at room temperature. The precipitated solid is separated and washed with methanol. On recrystallization from ethanol, there is obtained 4-benzyl-3-(3,4,5,6 - tetrahydropyrimidin - 2-yl)-isoquinolin-1-(2H)-one.

In the same manner, 3-furyl-3-hydroxy-1-oxo-2-isoindolineacetic acid is reacted with 1,3-diaminopropane to yield 4 - furyl - 3 - (3,4,5,6 - tetrahydropyrimindin - 2-yl) - isoquinolin-1-(2H)-one.

EXAMPLE VII

When the procedures of Examples V and VI are repeated, to react a hereinafter listed isoindolineacetic acid with 1,3-diaminopropane, the following pyrimindinylisoquinolinones are obtained:

| Starting material | Product |
| --- | --- |
| 3-(4-fluorophenyl)-3-hydroxy-1-oxo-2-isoindolineacetic acid, methyl ester. | 4-(4-fluorophenyl)-3-(3,4,5,6-tetrahydropyrimidin-2-yl)-isoquinolin-1-(2H)-one. |
| 3-hydroxy-5,6-dimethyl-1-oxo-3-phenyl-2-isoindolineacetic acid, ethyl ester. | 6,7-dimethyl-4-phenyl-3-(3,4,5,6-tetrahydropyrimidin-2-yl)-isoquinolin-1-(2H)-one. |
| 3-hydroxy-1-oxo-3-phenyl-5-propyl-2-isoindolineacetic acid, ethyl ester. | 4-phenyl-6-propyl-3-(3,4,5,6-tetrahydropyrimidin-2-yl)-isoquinolin-1-(2H)-one. |
| 3-(4-ethylphenyl)-3-hydroxy-5,6-dimethoxy-1-oxo-2-isoindolineacetic acid, methyl ester. | 4-(4-ethylphenyl)-6,7-dimethoxy-3-(3,4,5,6-tetrahydropyrimidin-2-yl)-isoquinolin-1-(2H)-one. |
| 3-(4-ethoxyphenyl)-3-hydroxy-1-oxo-2-isoindolineacetic acid, ethyl ester. | 4-(4-ethoxyphenyl)-3-(3,4,5,6-tetrahydropyrimidin-2-yl)-isoquinolin-1-(2H)-one. |

What is claimed is:
1. A compound selected from the group consisting of those having the formula:

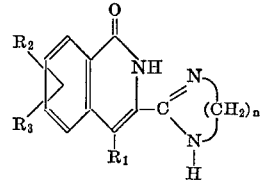

wherein $R_1$ is selected from the group consisting of phenyl, lower alkylphenyl, lower alkoxyphenyl, halophenyl, phen-(lower) alkyl, furyl, thienyl and naphthyl; $R_2$ and $R_3$ are both selected from the groups consisting of hydrogen, halogen, amino, lower alkyl and lower alkoxy; $n$ is an integer from 2 to 3; and the pharmaceutically acceptable acid addition salts thereof.

2. A compound as described in claim 1 which is: 4-(4-chlorophenyl) - 3 - (2-imidazolin-2-yl)-isoquinolin-1-(2H)-one.

3. A compound as described in claim 1 which is: 4-(4-chlorophenyl) - 3 - (3,4,5,6-tetrahydropyrimidin-2-yl)-isoquinolin-1-(2H)-one.

4. A compound as described in claim 1 which is: 4-(4-bromophenyl) - 3 - (2-imidazolin-2-yl)-isoquinolin-1-(2H)-one.

5. A compound as described in claim 1 which is: 6-chloro - 3 - (2-imidazolin-2-yl)-4-phenyl-isoquinolin-1-(2H)-one.

6. A compound as described in claim 1 which is: 3-(2-imidazolin-2-yl) - 7 - methoxy-4-phenyl-isoquinolin-1-(2H)-one.

7. A compound as described in claim 1 which is: 3-(2-imidazolin - 2 - yl) - 4 - (4-tolyl)-isoquinolin-1-(2H)-one.

8. A compound as described in claim 1 which is: 4-benzyl - 3 - (3,4,5,6-tetrahydropyrimidin - 2 - yl)-isoquinolin-1-(2H)-one.

9. A compound as described in claim 1 which is: 4-furyl - 3 - (3,4,5,6-tetrahydropyrimidin - 2 - yl)-isoquinolin-1-(2H)-one.

10. A compound as described in claim 1 which is: 6,7-dimethyl - 4 - phenyl-3-(3,4,5,6-tetrahydropyrimidin-2-yl)-isoquinolin-1-(2H)-one.

References Cited

UNITED STATES PATENTS 3,210,358  10/1965  Pfister et al. _____ 260—288

ALEX MAZEL, Primary Examiner

R. J. GALLAGHER, Assistant Examiner

U.S. Cl. X.R.

260—288, 326.1; 424—251, 258